(12) United States Patent
Karczewicz et al.

(10) Patent No.: US 9,538,190 B2
(45) Date of Patent: Jan. 3, 2017

(54) INTRA RATE CONTROL FOR VIDEO ENCODING BASED ON SUM OF ABSOLUTE TRANSFORMED DIFFERENCE

(71) Applicant: QUALCOMM Incorporated, San Diego, CA (US)

(72) Inventors: Marta Karczewicz, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 14/245,864

(22) Filed: Apr. 4, 2014

(65) Prior Publication Data

US 2014/0301460 A1    Oct. 9, 2014

Related U.S. Application Data

(60) Provisional application No. 61/809,846, filed on Apr. 8, 2013.

(51) Int. Cl.
| | |
|---|---|
| H04N 7/12 | (2006.01) |
| H04N 19/11 | (2014.01) |
| H04N 19/147 | (2014.01) |
| H04N 19/149 | (2014.01) |
| H04N 19/593 | (2014.01) |
| H04N 19/14 | (2014.01) |
| H04N 19/146 | (2014.01) |
| H04N 19/18 | (2014.01) |
| H04N 19/19 | (2014.01) |

(52) U.S. Cl.
CPC .............. *H04N 19/11* (2014.11); *H04N 19/14* (2014.11); *H04N 19/146* (2014.11); *H04N 19/147* (2014.11); *H04N 19/149* (2014.11); *H04N 19/18* (2014.11); *H04N 19/19* (2014.11); *H04N 19/593* (2014.11)

(58) Field of Classification Search
IPC ....................................................... H04N 19/14
See application file for complete search history.

(56) References Cited

U.S. PATENT DOCUMENTS

| | | | |
|---|---|---|---|
| 8,094,716 B1 | 1/2012 | Chen et al. | |
| 2007/0009025 A1 | 1/2007 | Kwon et al. | |
| 2007/0237224 A1* | 10/2007 | Krishnan | H04N 19/176 375/240.12 |
| 2010/0098173 A1* | 4/2010 | Horiuchi | H04N 19/176 375/240.18 |
| 2012/0269258 A1* | 10/2012 | Yang | H04N 19/00163 375/240.02 |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Tracy Y Li
(74) *Attorney, Agent, or Firm* — Shumaker & Sieffert, P.A.

(57) ABSTRACT

This disclosure describes techniques for rate control for intra coded frames. In one example of the disclosure, a rate control parameter may be calculated using a target bit rate and a complexity measure. In one example, the complexity measure is calculated with a sum of absolute transformed differences (SATD) calculation of an intra-coded frame.

26 Claims, 5 Drawing Sheets

(56) References Cited

U.S. PATENT DOCUMENTS

2014/0003498 A1* 1/2014 Sullivan ............ H04N 19/0009
375/240.03

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Karczewicz et al., "Intra Frame Rate Control Based on SATD," JCT-VC Meeting, MPEG Meeting, Apr. 18-26, 2013, Incheon, KR (Joint Collaborative Team on Video Coding of ITU-T SG.16 WP3 and ISO/IEC JTC1/SC29/WG11), URL: http://wftp3.itu.int/av-arch/jcivc-site/, No. JCTVC-M0257, XP030114214, 5 pp.
Ma et al., "A Study on the Rate Distortion Modeling for High Efficiency Video Coding," Image Processing (ICIP), 2012 19th IEEE International Conference On, IEEE, Sep. 2012, XP032333143, ISBN: 978-1-4673-2534-9 the whole document, pp. 181-184, 4 pp.
McCann et al., "High Efficiency Video Coding (HEVC) Test Model 10 (HM 10) Encoder Description," JCT-VC Meeting, MPEG Meeting, Jan. 14-23, 2013, Geneva, CH (Joint Collaborative Team on Video Coding of ITU-T SG.16 WP3 and ISO/IEC JTC1/SC29/WG11), URL: http://wftp3.itu.int/av-arch/jctvc-site/, No. JCTVC-L1002, XP030113947, 37 pp.
Sarwer et al., "A Novel Rate-Distortion Optimization Method of H.264/AVC Intra Coder," Image Processing (ICIP), 2011 18th IEEE International Conference On, IEEE, Sep. 11, 2011, XP032080441, DOI: 10.1109/ICIP.2011.6116459 ISBN: 978-1-4577-1304-0, pp. 3465-3468, 4 pp.
Si et al., "Adaptive Rate Control for High Efficiency Video Coding," 2012 Visual Communications and Image Processing, Nov. 1, 2012, XP055127645, DOI: 10.1109/VCIP.2012.6410769 ISBN: 978-1-46-734406-7, 6 pp.
Wu et al., "A Content-Adaptive Distortion-Quantization Model for Intra Coding in H.264/AVC," Computer Communications and Networks (ICCCN), 2011 Proceedings of 20th International Conference On, IEEE, Jul. 31, 2011, XP032049192, 6 pp.
Wu et al., "On Bit Allocation and Lagrange Multiplier Adjustment for Rate-Distortion Optimized H.264 Rate Control," Multimedia Signal Processing, 2009. MMSP '09. IEEE International Workshop On, IEEE, Piscataway, NJ, USA, Oct. 5, 2009, XP031550814, 6 pp.
International Search Report and Written Opinion from International Application No. PCT/US2014/033192, dated Jul. 28, 2014, 15 pp.
Second Written Opinion from International Application No. PCT/US2014/033192, dated Mar. 24, 2015, 11 pp.
International Preliminary Report on Patentability from International Application No. PCT/US20141033192, dated Jul. 9, 2015, 11 pp.

* cited by examiner

INTRA RATE CONTROL FOR VIDEO ENCODING BASED ON SUM OF ABSOLUTE TRANSFORMED DIFFERENCE

This application claims the benefit of U.S. Provisional Application No. 61/809,846, filed Apr. 8, 2013, the entire content of which is incorporated by reference herein.

TECHNICAL FIELD

This disclosure relates to video encoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as CTUs, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques for bit rate control for encoding intra predicted frames of video data. In one example of the disclosure, a bit rate control parameter may be calculated using a target bit rate and a complexity measure. In one example, the complexity measure is calculated with a sum of absolute transformed differences (SATD) calculation of an intra-coded frame.

In one example of the disclosure, a method for rate control in video encoding comprises determining a complexity measure of a frame of video data based on an SATD calculation on each block in the frame of video data, wherein the frame of video data is to be encoded using intra prediction, determining a rate control parameter based on the complexity measure and a target bit rate, determining an intra prediction mode based on the determined rate control parameter, and encoding the frame of video data using the determined intra prediction mode.

In another example of the disclosure, an apparatus configured to perform rate control in a video encoding process comprises a memory configured to store a frame of video data, and a video encoder configured to determine a complexity measure of the frame of video data based on an SATD calculation on each block in the frame of video data, wherein the frame of video data is to be encoded using intra prediction, determine a rate control parameter based on the complexity measure and a target bit rate, determine an intra prediction mode based on the determined rate control parameter, and encode the frame of video data using the determined intra prediction mode.

In another example of the disclosure, an apparatus configured to perform rate control in a video encoding process comprises means for determining a complexity measure of a frame of video data based on an SATD calculation on each block in the frame of video data, wherein the frame of video data is to be encoded using intra prediction, means for determining a rate control parameter based on the complexity measure and a target bit rate, means for determining an intra prediction mode based on the determined rate control parameter, and means for encoding the frame of video data using the determined intra prediction mode.

In another example, this disclosure describes a computer-readable storage medium storing instructions that, when executed, cause one or more processors of a device configured to encode video data to determine a complexity measure of the frame of video data based on an SATD calculation on each block in the frame of video data, wherein the frame of video data is to be encoded using intra prediction, determine a rate control parameter based on the complexity measure and a target bit rate, determine an intra prediction mode based on the determined rate control parameter, and encode the frame of video data using the determined intra prediction mode.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure describes techniques for bit rate control in a video encoding process. Some previous solutions for rate control for intra coded frames relied only on a target bit rate to determine a rate control parameter. However, such techniques lacked accuracy in maintaining the target bit rate when coding intra frames of differing complexity. This disclosure proposes rate control techniques for intra frames wherein a rate control parameter is determined using a complexity measure of an intra frame. In one example, the complexity measure is determined using a sum of absolute transformed differences (SATD) calculation on the intra frame.

Figure 1:
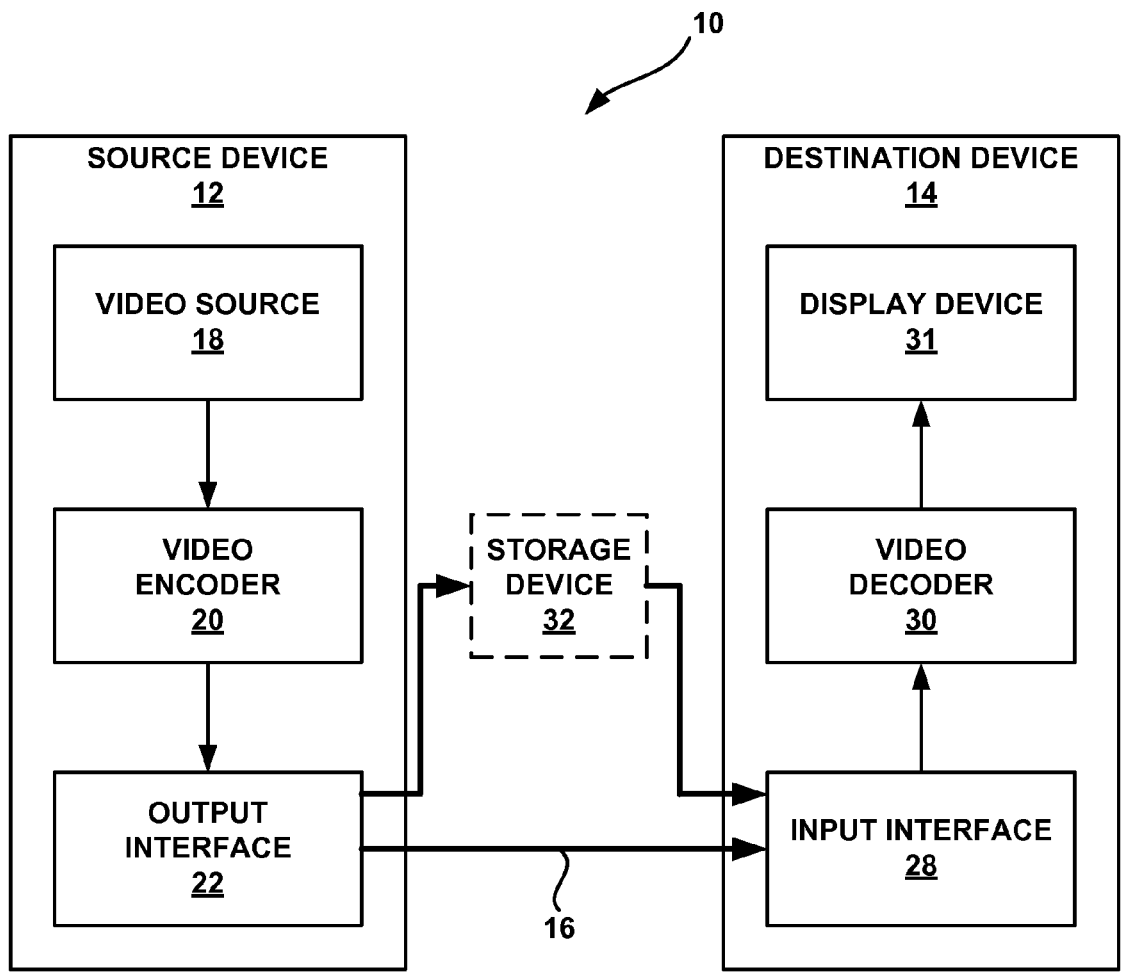
FIG. 1 is a block diagram illustrating an example video encoding and decoding system that may utilize the techniques described in this disclosure.

FIG. 1 is a block diagram illustrating an example video encoding and decoding system 10 that may utilize the intra rate control techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure for intra rate control are not necessarily limited to wireless applications or settings. The techniques for intra rate control may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 31. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 31 may be integrated with, or external to, destination device 14. In some examples, destination device 14 may include an integrated display device and also be configured to interface with an external display device. In other examples, destination device 14 may be a display device. In general, display device 31 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As will be explained in more detail below, video encoder 20 of FIG. 1 may be configured to determine a complexity measure of a frame of video data based on an SATD calculation on each block in the frame of video data, wherein the frame of video data is to be encoded using intra prediction, determine a rate control parameter based on the complexity measure and a target bit rate, determine an intra prediction mode based on the determined rate control parameter, and encode the frame of video data using the determined intra prediction mode. Video encoder 20 may further determine a quantization parameter based on the determined rate control parameter, and encode the frame of video data using the determined quantization parameter.

The JCT-VC developed the HEVC standard based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes. One draft of the HEVC standard, referred to as "HEVC Working Draft 10" or "WD10," is described in document JCTVC-L1003v34, Bross et al., "High efficiency video coding (HEVC) text specification draft 10," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which, as of Apr. 8, 2013, is downloadable from http://phenix.int-evry.fr/jct/doc_end_user/documents/12_Geneva/wg11/JCTVC-L1003-v34.zip. The entire content of HEVC WD10 is hereby incorporated herein by reference.

In general, the working model of the HM describes that a video frame or picture may be divided into a sequence of coding tree units (CTUs) or largest coding units (LCU) that include both luma and chroma samples. A CTU has a similar purpose as a macroblock of the H.264 standard. A slice includes a number of consecutive CTUs in coding order. A video frame or picture may be partitioned into one or more slices. Each CTU may be split into coding units (CUs) according to a quadtree. For example, a CTU, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a CTU may be split, and may also define a minimum size of the coding nodes.

A CU includes a coding node, as well as prediction units (PUs) and transform units (TUs) associated with the coding node. A size of the CU corresponds to a size of the coding node and may be square in shape. The size of the CU may range from 8×8 pixels up to the size of the CTU with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a CTU, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m. As will be explained in more detail below, a quantization parameter may be set based on a rate control parameter determined in accordance with the techniques of this disclosure.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not.

Figure 2:
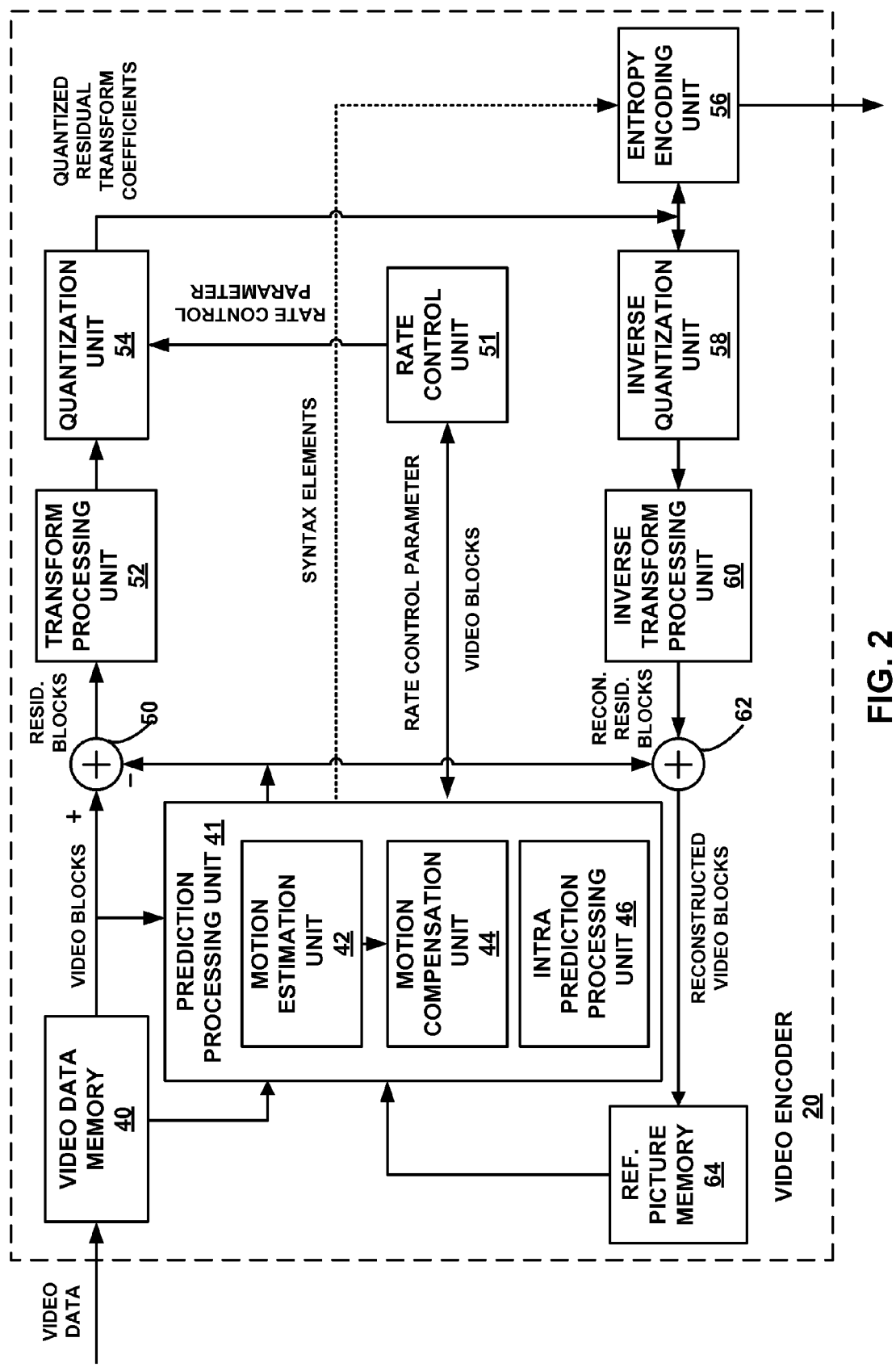
FIG. 2 is a block diagram illustrating an example video encoder that may implement the techniques described in this disclosure.

FIG. 2 is a block diagram illustrating an example video encoder 20 that may implement the intra rate control techniques described in this disclosure. Video encoder 20 may be configured to perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes video data memory 40, prediction processing unit 41, reference picture memory 64, summer 50, transform processing unit 52, quantization unit 54, rate control unit 51, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. Reference picture memory 64 is one example of a decoded picture buffer (DPB) that stores reference video data for use in encoding video data by video encoder 20 (e.g., in intra- or inter-coding modes, also referred to as intra- or inter-prediction coding modes). Video data memory 40 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and reference picture memory 64 may be provided by the same memory device or separate memory devices. In various examples, video data memory 40 may be on-chip with other components of video encoder 20, or off-chip relative to those components.

Video encoder 20 receives video data, and a partitioning unit (not shown) partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). As will discussed in more detail below, in accordance with the techniques of this disclosure, prediction processing unit 41 may be configured to select a prediction mode based on a rate control parameter determined and supplied by rate control unit 51. Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction processing unit 46 may perform intra-prediction on a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 may select an appropriate intra-prediction mode to use from the tested modes. For example, intra prediction processing unit 46 may calculate rate-distortion values using a rate-distortion analysis for the various tested intra-prediction modes, and select the intra-prediction mode having the best rate-distortion characteristics among the tested modes. As will discussed in more detail below, intra prediction processing unit 46 may be configured to determine an intra prediction mode with a rate-distortion analysis that is based on a rate control parameter supplied by rate control unit 51. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

In any case, after selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to a reference frame to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Video encoder 20 may further include a rate control unit 51 which is configured to control the rate of video encoding (i.e., the number of bits that are used to represent the encoded video). Rate control unit 51 may control the rate of video encoding by determining a rate control parameter. The rate control parameter generated by rate control unit 51 may be used by both prediction processing unit 41 and quantization unit 54 to control the rate of video encoding. As will be explained in greater detail below, prediction processing unit 41 may use the rate control parameter in a rate-distortion analysis used to select a prediction mode (i.e., the best inter or intra prediction mode). In addition, quantization unit 54 may use the rate control parameter to determine a quantization parameter. Both the determined prediction mode and the quantization parameter affect the encoding rate of video encoder.

In accordance with the techniques of this disclosure, as will be explained in greater detail below, video encoder 20 (including rate control unit 51) may be configured to determine a complexity measure of a frame of video data based on a sum of absolute transformed differences (SATD) calculation on one or more blocks in the frame of video data, wherein the frame of video data is to be encoded using intra prediction. Video encoder 20 may be further configured to determine a rate control parameter based on the complexity measure and a target bit rate, and determine an intra prediction mode based on the determined rate control parameter. Video encoder 20 may then encode the frame of video data using the determined intra prediction mode. The following description discusses general rate control techniques, as well as the rate control for intra frames according to the techniques of this disclosure.

In a typical video encoder (e.g., video encoder 20), the frame of an original video sequence is partitioned into rectangular regions or blocks, which may be encoded in Intra-mode (I-mode) or Inter-mode (P-mode or B-mode). The blocks are coded using some kind of transform coding, such as DCT coding. However, pure transform-based coding only reduces the inter-pixel correlation within a particular block, without considering the inter-block correlation of pixels. Transform-based coding still produces high bit-rates for transmission. Current digital image coding standards, such as HEVC, also exploit certain methods that reduce the correlation of pixel values between blocks.

In general, blocks encoded in P-mode are predicted from one of the previously coded and transmitted frames. The prediction information of a block is represented by a two-dimensional (2D) motion vector. For the blocks encoded in I-mode, the predicted block is formed using spatial prediction from already encoded neighboring blocks within the same frame. The prediction error $E(x, y)$, i.e., the difference between the block being encoded $I(x, y)$ and the predicted block $P(x, y)$, is represented as weighted sum of a transform basis functions $f_{ij}(i, j)$:

$$E(x, y) = \sum_{i=0}^{N-1} \sum_{j=0}^{N-1} c_{ij} f_{ij}(i, j) \qquad (1)$$

The transform is typically performed on an 8×8 (N=8) or 4×4 (N=4) block basis. The weights $c_{ij}$, called prediction error coefficients, are subsequently quantized:

$$l_{ij} = Q(c_{ij}, QP), \qquad (2)$$

where $l_{ij}$ are called the quantized coefficients or levels. The operation of quantization introduces loss of information. On the other hand, the quantized coefficient can be represented with smaller number of bits. The level of compression (loss of information) is controlled by adjusting the value of the quantization parameter (QP). A lower QP value typically results in less distortion, but may require more bits, and thus a higher bit-rate. A higher QP value typically results in more distortion, but may require fewer bits, and thus a lower bit-rate. As such, the selection of the QP is one technique whereby a tradeoff between distortion and bit rate may be made.

Quantized transform coefficients, together with motion vectors and some control information, form a complete coded sequence representation, and are referred to as syntax elements. Prior to transmission from video encoder 20 to video decoder 30, syntax elements may be entropy coded so as to further reduce the number of bits needed for their representation.

At video decoder 30, the reconstructed block in the current frame is obtained by first constructing its prediction in the same manner as performed by video encoder 20, and by adding the compressed prediction error to the prediction. The compressed prediction error is found by using the de-quantized coefficients by performing inverse transform:

$$\tilde{E}(x, y) = \sum_{i=0}^{N-1} \sum_{j=0}^{N-1} r_{ij} \tilde{f}_{ij}(i, j) \quad (3)$$

The dequantized (also called reconstructed) coefficients $r_{ij}$ are calculated by the inverse quantization:

$$r_{ij} = Q^{-1}(l_{ij}, QP) \quad (4)$$

The difference between the reconstructed frame R(x, y) and the original frame I(x, y) is called reconstruction error.

The HEVC standard leaves decisions regarding quantization, selection of the motion vectors, and which frame should be used for prediction, to the implementer of video encoder 20. Rate-distortion theory formalizes the lossy compression goal into that of minimizing coding distortion, which is a measure of distance between the original and the compressed data according to a chosen metric, subject to a constraint in the rate for coding the data. Thus, one goal of video encoder 20 is to find, for each frame, values of syntax elements such that the mean-squared-error (MSE) distortion D between the prediction error E(x,y) and the reconstructed version of the prediction error $\tilde{E}(x, y)$ is minimized subject to a constraint in the rate R for coding the syntax elements:

$$\min[D(E(x,y) - \tilde{E}(x,y))] \text{ subject to } R < R_{budget}. \quad (5)$$

Other additive distortion metrics can be used instead of MSE, e.g., activity-weighted MSE. The rate-constrained problem in equation (5) can be solved by being converted to an equivalent unconstrained problem by "merging" rate and distortion through the Lagrange multiplier λ. In this disclosure, the Lagrange multiplier λ will be referred to as the rate control parameter. The unconstrained problem becomes the determination (for a fixed λ) of values of syntax elements, which results in the minimum total Lagrangian Cost defined as $$J(\lambda) = D(E(x,y) - \tilde{E}(x,y)) + \lambda R. \quad (6)$$

The rate control parameter λ can be viewed as a parameter used to determine a trade-off between rate and distortion. A low value of λ favors minimizing distortion over rate, and a high value of λ favors minimizing rate over distortion. At the limits, where λ equals zero, distortion is minimized; where λ tends to infinity, rate is minimized.

In video encoder 20 and video decoder 30, there are buffers (e.g., in video data memory 40 of FIG. 2) to temporally store encoded bits, which cause the so-called end-to-end delay. Often, the challenge of rate control in video encoding is to determine an appropriate value of λ to achieve the best video quality within a buffer size constraint.

In HM, the complexity of each CTU is used to allocate the CTUs bit budget for inter frames. The complexity for inter frames is measured by the Mean Absolute Difference (MAD) of the CTU at the same location in the previous frame. However, in case of intra frames, it may be expected that correlation between consecutive intra coded frames will be smaller than the correlation between inter coded frames, since, in the majority of practical use cases, consecutive intra frames occur at larger temporal distances from each other.

In HM, the rate control parameter λ for intra frames is calculated using only target rate $R_t$ of the current frame (or CTU). Techniques for rate control only using a target rate are described in JCTVC-K0103, "Rate control by R-lambda model for HEVC," by B. Li, et al., Joint Collaborative Team on Video Coding (JCT-VC) of ITU-T SG 16 WP 3 and ISO/IEC JTC 1/SC 29/WG 11, Shanghai, CN, 10-19 Oct. 2012. JCTVC-K0103 is hereby incorporated by reference herein. Only using the target rate to calculate the rate control parameter λ may not be accurate in all conditions. The complexity in performing intra prediction coding for I-frames varies from frame to frame, typically depending on the complexity of the video content of that frame. That is, some intra frames may require more bits to encode than others to maintain the same level of distortion. The rate control techniques of JCTVC-K0103 do not take this in to consideration.

In view of these drawbacks, this disclosure proposes to alter the HM model used to determine the rate control parameter λ for an intra frame (or CTU of an intra frame) by adding a complexity measure C of that frame/CTU:

$$\lambda = \alpha \left( \frac{C}{R_{target}} \right)^\beta. \quad (7)$$

Initial values for the secondary rate control parameters α and β are determined by fitting the model in equation (7) to statistics of a number of natural images. For example, α and β may take an initial value of 6.7542 and 1.7860, respectively. As shown above in equation (6), the rate control parameter λ may be used in a rate-distortion analysis to determine an appropriate prediction mode (e.g., to determine a specific intra prediction mode for CUs of an I-frame). In addition, the QP value may also be calculated using the rate control parameter λ, as proposed in JCTVC-I0426, "QP determination by lambda value," by B. Li, et al., Joint Collaborative Team on Video Coding (JCT-VC) of ITU-T SG 16 WP 3 and ISO/IEC JTC 1/SC 29/WG 11, Geneva, CH, 27 Apr.-7 May 2012:

$$QP = 4.2005 \ln(\lambda) + 13.7122. \quad (8)$$

JCTVC-I0426 is hereby incorporated by reference herein.

In one example of the disclosure, a complexity measure is based on a Sum of Absolute Transformed Differences (SATD) calculation. An SATD is the sum of absolute values of coefficients $h_{ij}$ obtained after applying a transform (e.g., a Hadamard transform) to a block of pixels (e.g., an 8×8 block of luma pixels). As one example:

$$SATD = \sum_{i=0}^{N-1} \sum_{j=0}^{N-1} |h_{ij}|, N = 8 \quad (9)$$

where N is the height/width of the square block in pixels, i is the row of the transform coefficient, and j is the column of the transform coefficient. The SATD value calculated using Eq. (9) would be the SATD value of one block of an intra frame. To calculate the SATD value of a CTU or the entire frame, the SATD values of each block (e.g., each 8×8 block) would simply be added together for the CTU or the entire frame. In other examples, an SATD calculation may be made on less than all blocks in a CTU. For example, an SATD calculation may be made on a single block in a CTU. In another example, an SATD calculation may be made on every other 8×8 block in a CTU row. It should be noted that the Hadamard transform (or other type of transform) is applied to the pixel values themselves, and not to a prediction residual, as would be done in the video encoding process. The values of transform coefficients when transforming the pixels themselves represent an accurate measurement of complexity.

To take into account particular characteristics of intra prediction, some modified measures of an SATD calculation may be used so that certain low frequency coefficients may be excluded or counted to a lesser degree in the complexity calculation. For example, a first SATD value ($SATD_0$) and a second SATD value ($SATD_1$) may be calculated using the following equations:

$$SATD_0 = SATD - |h_{00}| \quad (10)$$

and $$SATD_1 = \sum_{i=0}^{N-1} \sum_{j=0}^{N-1} |h_{ij}|. \quad (11)$$

The first SATD value ($SATD_0$) is calculated by determining the SATD for the entire block and then subtracting the transform coefficient at position (0,0) in the block (i.e., the DC coefficient). As every block will have some non-zero value at the DC coefficient position and such DC component may be well predicted through intra prediction, removing the DC coefficient value from the SATD calculation results in a more accurate determination of complexity. That is, the coefficient values at locations other than the DC coefficient position are more indicative of the complexity of the block than the value at the DC coefficient. To compute the first SATD value ($SATD_0$) for a CTU or the entire frame, the first SATD value ($SATD_0$) is calculated for each block in the CTU or the frame, and all the resultant first SATD values are summed together.

The second SATD value ($SATD_1$) is calculated by calculating the SATD value for the block without using the value of any transform coefficient in the first row and the first column of the block. Like transform values at the DC coefficient position, it is more likely than not that the first row and first column of a transformed block will have some non-zero values which may be well predicted through intra prediction. As such, transform coefficient values at the other locations in the transformed block may be more indicative of complexity. To compute the second SATD value ($SATD_1$) for a CTU or the entire frame, the second SATD value ($SATD_1$) is calculated for each block in the CTU or the frame, and all the resultant second SATD values are summed together.

In some examples, the first SATD value ($SATD_0$) or the second SATD value ($SATD_1$) described above may be used as the sole SATD value used as the complexity measure of intra frame rate control. However, any calculation of an SATD value may be used as the complexity measure, including an SATD value calculated using Eq. (9). In other examples, as will be described below, both the first SATD value ($SATD_0$) and the second SATD value ($SATD_1$) may be calculated, and one of the SATD values may be chosen to be used as the complexity measure based on some predetermined criteria.

For example, it has been observed that good results may be obtained when both the first SATD value ($SATD_0$) and the second SATD value ($SATD_1$) are calculated, and one of the first or second SATD values is selected to be used for the complexity measure C. In one example, the first SATD value ($SATD_0$) is used unless it is larger than a predetermined threshold. Such a threshold value may be fixed, or may be adapted per GOP or frame. If, the first SATD value ($SATD_0$) is larger than the predetermined threshold hold, the second SATD value ($SATD_1$) is used.

In another example of the disclosure, the second SATD value ($SATD_1$) is used for video data having a resolution of 720p and above, and the first SATD value ($SATD_0$) is used otherwise.

Figure 3:
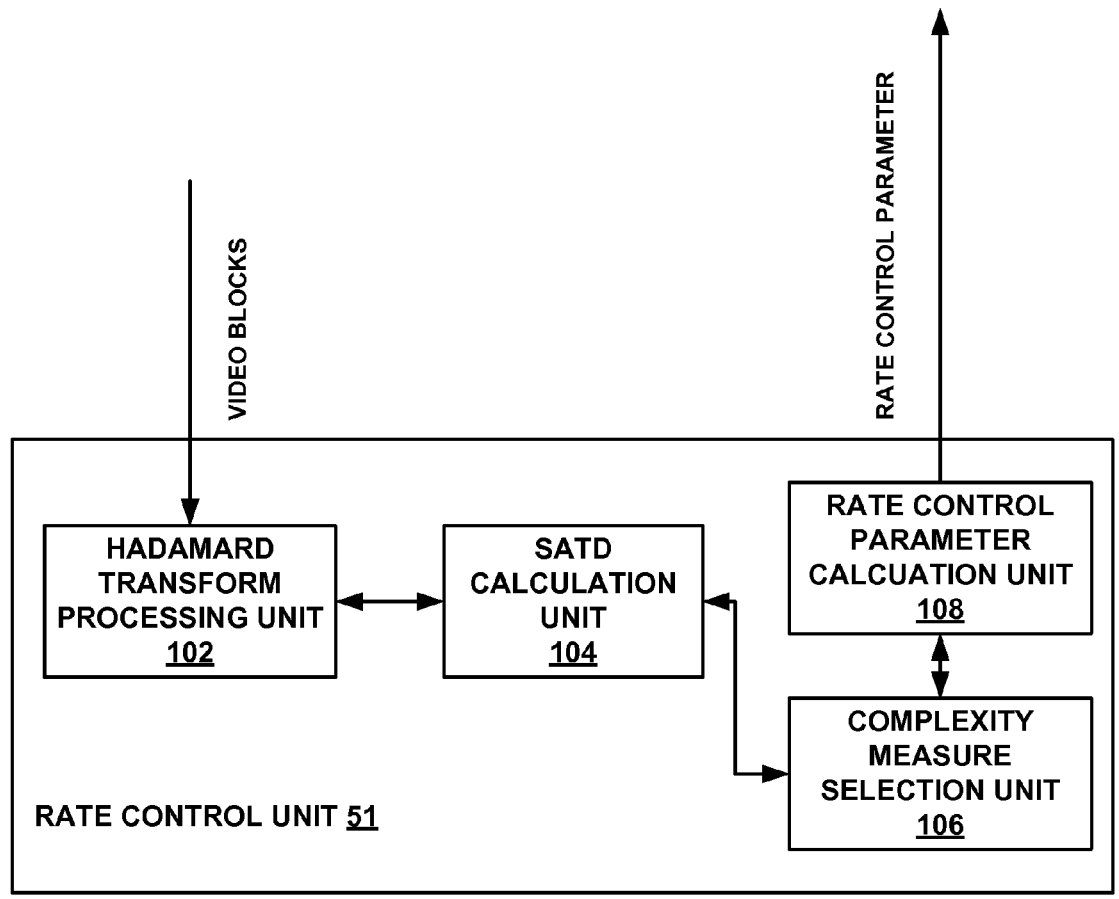
FIG. 3 is a block diagram illustrating an example rate control unit that may implement the techniques described in this disclosure.

FIG. 3 is a block diagram showing an example rate control unit configured to implement the techniques of this disclosure. Rate control unit 51 may include a Hadamard transform processing unit 102, an SATD calculation unit 104, a complexity measure selection unit 106, a rate control parameter calculation unit 108.

Hadamard transform processing unit 102 may be configured to receive video blocks (e.g., CTUs) from an intra frame. Hadamard transform processing unit 102 may be configured to apply a Hadamard transform to each of the video blocks (e.g., to luma values in each luma block of a CTU). The resulting transform coefficients in the blocks may be provided to SATD calculation unit 104.

SATD calculation unit 104 may calculate an SATD value for each block of a CTU, e.g., using the techniques shown in Eq. (9). SATD calculation unit 104 may calculate an SATD value for the entire frame by summing together the SATD values for each block in the frame. In one example of the disclosure, SATD calculation unit 104 may be configured to calculate a first SATD value ($SATD_0$) and a second SATD value ($SATD_1$) for each block of the intra frame using the techniques shown in Eq. (10) and Eq. (11). The resultant SATD values (first and second SATD values) are then made available to complexity measure selection unit 106.

Based on the received SATD values, complexity measure selection unit 106 may select an SATD value to be used as the complexity measure for the CTU or frame. As discussed above, complexity measure selection unit 106 may select an SATD value based on a predetermined threshold, or based on the resolution of the video. The selected complexity measure is then provided to rate control parameter calculation unit 108 to calculate the rate control parameter λ. For example, rate control parameter calculation unit 108 may calculate the rate control parameter λ using the complexity measure and a target bit rate, as shown in Eq. (7) above. The target bit rate may be set by the video encoder based on a bit budget for a video sequence. The bit budget may be based on the particular video encoding application being used. As will be described in more detail below, rate control parameter calculation unit 108 may be configured to update the rate control parameter λ and the secondary rate control parameters α and β on either a frame or block level.

This disclosure proposes three different modes of operation for rate control for intra frames using the complexity measure described above. For example, the following modes may be used:
1) Use a constant rate control parameter λ for the whole frame. Secondary rate control parameters α and β are updated after each frame is encoded.
2) Secondary rate control parameters α and β remain constant for the entire frame. However, bits are allocated per CTU depending on the number of remaining bits allocated to this frame. The value of rate control parameter λ is calculated for each CTU using Eq. (7).

3) Secondary rate control parameters α and β are updated after encoding each CTU. As in mode 2 above, bits are allocated per CTU depending on the number of remaining bits allocated to this frame. The value of rate control parameter λ is calculated for each CTU using Eq. (7).

The next section of the disclosure will discuss parameter adaptation for the rate control parameter λ and the secondary rate control parameters α and β. In all modes after encoding a picture, the values of the obtained (actual) bits $R_{actual}$ (i.e., the number bits that were actually encoded) are used to update the values of α and β:

$$\alpha = \alpha e^{\Delta \lambda},\qquad(12)$$

$$\beta = \beta + \frac{\Delta \lambda}{\ln(C/R_{actual})},\qquad(13)$$

where $$\Delta \lambda = \delta \beta (\ln(R_{actual}) - \ln(R_{target}))\qquad(14)$$

and δ is a scaling parameter which reduces the speed of λ changes. In one example, δ may be set to 0.25. In mode 3, the values of α and β are also updated after encoding of each CTU. $R_{target}$ is the sum of the target bits allocated to the already encoded CTUs for the frame being encoded and $R_{actual}$ is the total number of bits obtained when encoding those CTUs.

The next section of the disclosure will discuss bit allocation. In mode 3 (i.e., updating the rate control parameter and the secondary rate control parameters on a block level), the number of target bits $R_{target}^{CTU}(i)$ allocated to ith CTU is derived as follows:

$$R_{target}^{CTU}(i) = \omega(i) R_{left}.\qquad(15)$$

The term $R_{left}$ denotes total remaining bits available to code the frame. Weight ω(i) is a ratio of complexity $C^{CTU}(i)$ of the ith CTU to the complexity of all the remaining CTUs which are still to be coded:

$$\omega(i) = \frac{C^{CTU}(i)}{\sum_{j=i}^{M-1} C^{CTU}(j)},\qquad(16)$$

where M is the number of the CTUs in the coded frame.

In mode 2 (i.e., only updating the rate control parameter λ on the block level), since parameters α and β are not being adapted, it can be expected that if their initial values are not matching the statistics of the frame, there will be a mismatch between allocated number of bits and the actual number of bits obtained during the encoding. To compensate for that, modified remaining bits $\tilde{R}_{left}$ is used to obtain the number of bits allocated to code ith CTU:

$$R_{target}^{CTU}(i) = \omega(i) \tilde{R}_{left}.\qquad(17)$$

Modified remaining bits $\tilde{R}_{left}$ are calculated as follows:

$$\tilde{R}_{left} = R_{left} + \frac{\left(R_{left} - \sum_{j=i}^{M-1} R_{initTarget}^{CTU}(j)\right)(M-i)}{W},\qquad(18)$$

where $R_{initTarget}^{CTU}(j)$ is the initial bit target allocated to each CTU as follows:

$$R_{initTarget}^{CTU}(i) = \frac{C^{CTU}(i)}{\sum_{j=0}^{M-1} C^{CTU}(j)} R_{target}\qquad(19)$$

and W is the size of a window, which is used to make the bitrate change smoother. The W used in our simulations is 4. The term $R_{target}$ denotes the number of bits allocated to code the frame.

Figure 4:
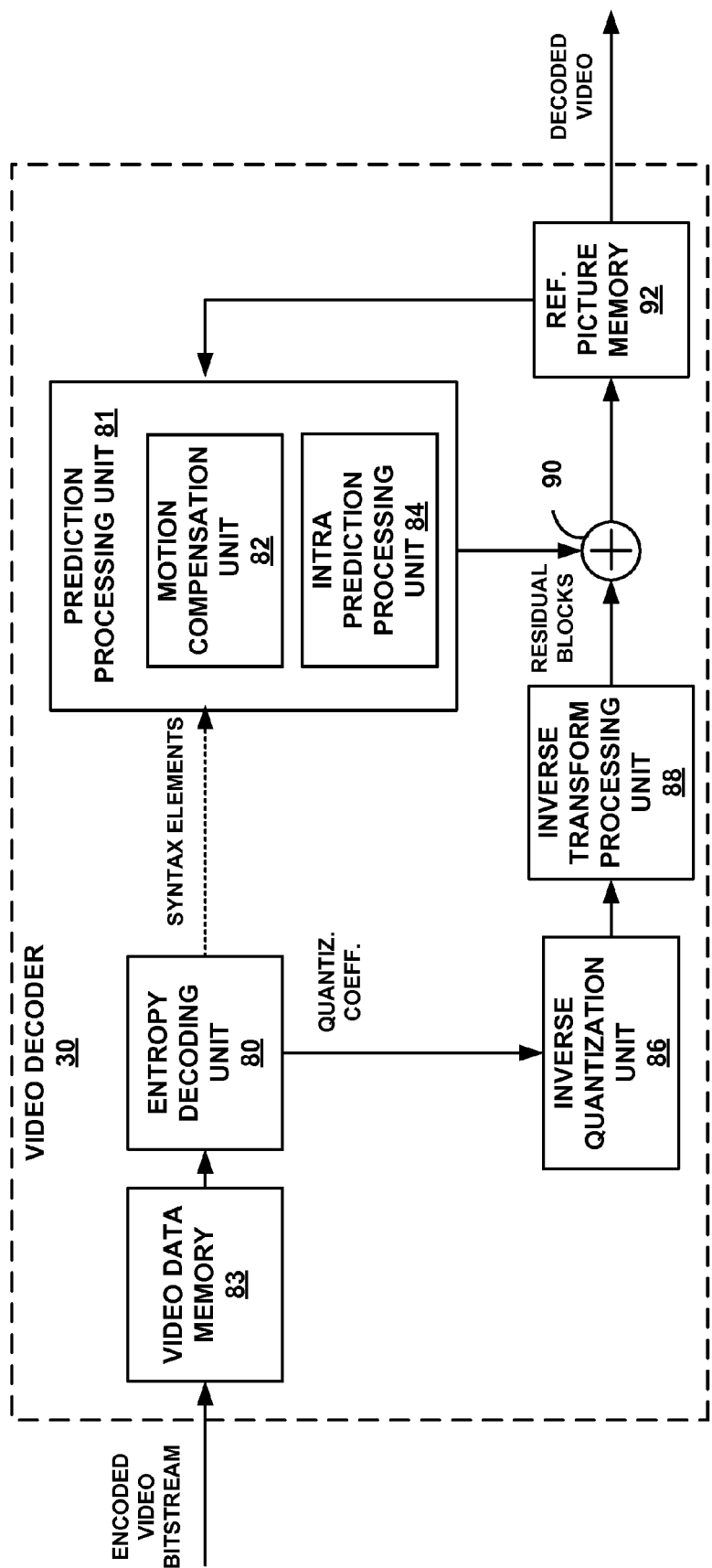
FIG. 4 is a block diagram illustrating an example video decoder.

FIG. 4 is a block diagram illustrating an example video decoder 30. In the example of FIG. 4, video decoder 30 includes video data memory 83, entropy decoding unit 80, prediction processing unit 81, inverse quantization unit 86, inverse transformation processing unit 88, summer 90, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

Video data memory 83 may store video data to be decoded by the components of video decoder 30. The video data stored in video data memory 83 may be obtained, for example, from video encoder 20. Reference picture memory 92 is one example of a decoded picture buffer (DPB) that stores reference video data for use in decoding video data by video decoder 30 (e.g., in intra- or inter-coding modes, also referred to as intra- or inter-prediction coding modes). Video data memory 83 and reference picture memory 92 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 83 and reference picture memory 92 may be provided by the same memory device or separate memory devices. In various examples, video data memory 83 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 31 of FIG. 1.

Figure 5:
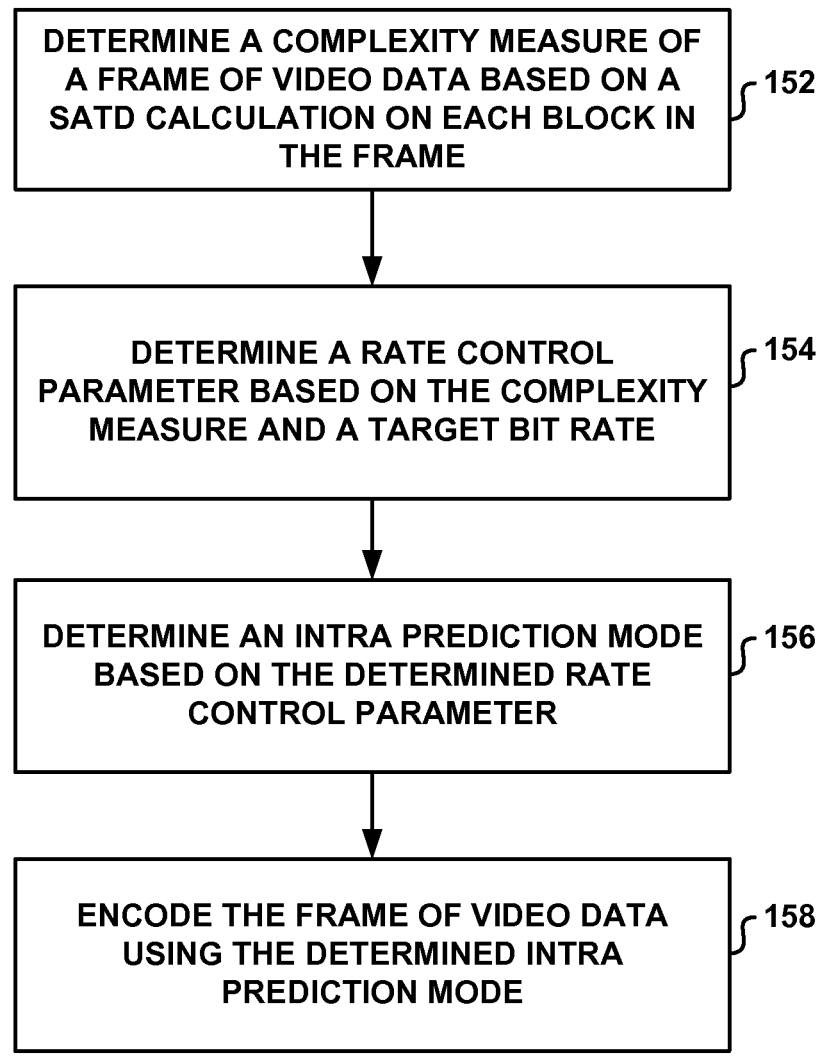
FIG. 5 is a flowchart illustrating an example method of the disclosure.

FIG. 5 is a flowchart illustrating an example method of the disclosure. The techniques of FIG. 5 may be implemented by one or more components of video encoder 20, including rate control unit 51.

In one example of the disclosure, rate control unit 51 may be configured to determine a complexity measure of the frame of video data based on an SATD calculation on each block in the frame of video data (152), wherein the frame of video data is to be encoded using intra prediction. Rate control unit 51 may be further configured to determine a rate control parameter based on the complexity measure and a target bit rate (154). Video encoder 20 may be configured to determine an intra prediction mode based on the determined rate control parameter (156), and encode the frame of video data using the determined intra prediction mode (158). In a further example of the disclosure, video encoder 20 may be further configured to determine a quantization parameter based on the determined rate control parameter, and encode the frame of video data using the determined quantization parameter.

In one example of the disclosure, video encoder 20 is configured to determine the complexity measure and the rate control parameter for each block of the frame of video data. In one example, video encoder 20, including rate control unit 51, is further configured to determine the complexity measure by performing a frequency domain transformation on the block producing a block of transform coefficients, calculating a first SATD value by summing all of the transform coefficients and subtracting a value of a transform coefficient at a DC coefficient position in the block of transform coefficients, and assigning the first SATD value as the complexity measure. In another example of the disclosure, video encoder 20, including rate control unit 51, is further configured to determine the complexity measure by performing a frequency domain transformation on the block producing a block of transform coefficients, calculating a second SATD value by summing all of the transform coefficients in the block of transform coefficients except for transform coefficients in a top-most row and a left-most column of the block transform coefficients, and assigning the second SATD value as the complexity measure. In another example, rate control unit 51 may be further configured to calculate both the first and second SATD value, and to select either the first SATD value or the second SATD value as the complexity measure based on predetermined criteria.

In one example, rate control unit 51 is configured to select the first SATD value as the complexity measure in the case that the first SATD value is smaller than a predetermined threshold, and select the second SATD value as the complexity measure in the case that the first SATD value is larger than a predetermined threshold. In another example, rate control unit 51 is configured to select the first SATD value as the complexity measure in the case that the frame of video data has a resolution smaller than 720p, and select the second SATD value as the complexity measure in the case that the frame of video data has a resolution greater than or equal to 720p.

In another example of the disclosure, video encoder 20 is configured to determine the complexity measure and the rate control parameter for the entire frame of video data. In this example, video encoder 20, including rate control unit 51 is configured to determine the complexity measure of the frame of video data by performing a frequency domain transformation on each block of the frame video data producing a block of transform coefficients, calculating a first SATD value for each block by summing all of the transform coefficients of a respective block and subtracting a value of a transform coefficient at a DC coefficient position, summing the first SATD value for each block to produce a first frame SATD value, calculating a second SATD value for each by summing all of the transform coefficients in the block of transform coefficients of a respective block except for transform coefficients in a top-most row and a left-most column of the block transform coefficients, summing the second SATD value for each block to produce a second frame SATD value, and selecting either the first frame SATD value or the second frame SATD value as the complexity measure.

In one example of the disclosure, rate control unit 51 is configured to select the first frame SATD value as the complexity measure in the case that the first frame SATD value is smaller than a predetermined threshold, and select the second frame SATD value as the complexity measure in the case that the first frame SATD value is larger than a predetermined threshold. In another example of the disclosure, rate control unit 51 is configured to select the first frame SATD value as the complexity measure in the case that the frame of video data has a resolution smaller than 720p, and select the second frame SATD value as the complexity measure in the case that the frame of video data has a resolution greater than or equal to 720p.

In one example of the disclosure, rate control unit 51 is configured to determine the rate control parameter by calculating the equation $$\lambda = \alpha \left( \frac{C}{R_{target}} \right)^{\beta},$$

wherein $\lambda$ is the rate control parameter, C is the complexity measure, $R_{target}$ is the target bit rate, and $\alpha$ and $\beta$ are secondary rate control parameters.

In one example the disclosure, rate control unit 51 is configured to update the secondary rate control parameters on a frame level. In another example of the disclosure, rate control unit 51 is configured to update the secondary rate control parameters on a block level.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for rate control in video encoding, the method comprising:
    determining a complexity measure of an intra frame of video data based on a sum of absolute transformed differences (SATD) calculation on each block in the intra frame of video data, wherein the intra frame of video data is to be encoded using intra prediction;
    determining a rate control parameter for the intra frame based on the complexity measure and a target bit rate;
    determining intra prediction modes for the intra frame based on the determined rate control parameter for the intra frame;
    determining a quantization parameter based on the determined rate control parameter for the intra frame; and
    encoding the intra frame of video data using the determined intra prediction modes and the determined quantization parameter.

2. The method of claim 1, wherein the complexity measure and the rate control parameter are determined for each coding tree unit (CTU) of the intra frame of video data.

3. The method of claim 2, wherein determining the complexity measure of one CTU of the intra frame of video data comprises:
    performing a frequency domain transformation on the CTU producing a block of transform coefficients;
    calculating a first SATD value by summing all of the transform coefficients and subtracting a value of a transform coefficient at a DC coefficient position in the block of transform coefficients; and
    assigning the first SATD value as the complexity measure.

4. The method of claim 3, wherein performing the frequency domain transformation on the CTU comprises performing the frequency domain transformation on every block of the CTU, and wherein calculating the first SATD value comprises calculating the first SATD value by summing all of the transform coefficient of each block and subtracting the value of the transform coefficient at the DC coefficient position in the block of transform coefficients.

5. The method of claim 2, wherein determining the complexity measure of one CTU of the intra frame of the video data comprises:
    performing a frequency domain transformation on the CTU producing a block of transform coefficients;
    calculating a second SATD value by summing all of the transform coefficients in the block of transform coefficients except for transform coefficients in a top-most row and a left-most column of the block transform coefficients; and
    assigning the second SATD value as the complexity measure.

6. The method of claim 2, wherein determining the complexity measure of one CTU of the intra frame of video data comprises:
    performing a frequency domain transformation on the CTU producing a block of transform coefficients;
    calculating a first SATD value by summing all of the transform coefficients and subtracting a value of a transform coefficient at a DC coefficient position in the block of transform coefficients;
    calculating a second SATD value by summing all of the transform coefficients in the block of transform coefficients except for transform coefficients in a top-most row and a left-most column of the block transform coefficients; and
    selecting either the first SATD value or the second SATD value as the complexity measure based on one or more predetermined criteria.

7. The method of claim 6, wherein selecting either the first SATD value or the second SATD value as the complexity measure comprises:
    selecting the first SATD value as the complexity measure in the case that the first SATD value is smaller than a predetermined threshold; and
    selecting the second SATD value as the complexity measure in the case that the first SATD value is larger than a predetermined threshold.

8. The method of claim 6, wherein selecting either the first SATD value or the second SATD value as the complexity measure comprises:
    selecting the first SATD value as the complexity measure in the case that the intra frame of video data has a resolution smaller than 720p; and
    selecting the second SATD value as the complexity measure in the case that the intra frame of video data has a resolution greater than or equal to 720p.

9. The method of claim 1, further comprising determining the complexity measure and the rate control parameter for the entire intra frame of video data.

10. The method of claim 1, wherein determining the rate control parameter comprises:
    calculating the equation $$\lambda = \alpha \left( \frac{C}{R_{target}} \right)^{\beta},$$

wherein $\lambda$ is the rate control parameter, C is the complexity measure, $R_{target}$ is the target bit rate, and $\alpha$ and $\beta$ are secondary rate control parameters.

11. The method of claim 10, the method further comprising:
    updating the secondary rate control parameters on a frame level.

12. The method of claim 10, the method further comprising:
    updating the secondary rate control parameters on a coding tree unit (CTU) level.

13. An apparatus configured to perform rate control in a video encoding process, the apparatus comprising:
    a memory configured to store an intra frame of video data; and
    a video encoder configured to:
        determine a complexity measure of the intra frame of video data based on a sum of absolute transformed differences (SATD) calculation on each block in the intra frame of video data, wherein the intra frame of video data is to be encoded using intra prediction;
        determine a rate control parameter for the intra frame based on the complexity measure and a target bit rate;
        determine intra prediction modes for the intra frame based on the determined rate control parameter for the intra frame;
        determine a quantization parameter based on the determined rate control parameter for the intra frame; and
        encode the intra frame of video data using the determined intra prediction modes and the determined quantization parameter.

14. The apparatus of claim 13, wherein video encoder is configured to determine the complexity measure and the rate control parameter for each coding tree unit (CTU) of the intra frame of video data.

15. The apparatus of claim 14, wherein the video encoder is further configured to determine the complexity measure by:
    performing a frequency domain transformation on the CTU producing a block of transform coefficients;
    calculating a first SATD value by summing all of the transform coefficients and subtracting a value of a transform coefficient at a DC coefficient position in the block of transform coefficients;
    assigning the first SATD value as the complexity measure.

16. The apparatus of claim 15, wherein performing the frequency domain transformation on the CTU comprises performing the frequency domain transformation on every block of the CTU, and wherein calculating the first SATD value comprises calculating the first SATD value by summing all of the transform coefficient all of the transform coefficients and subtracting a value of a transform coefficient at a DC coefficient position in the block of transform coefficients.

17. The apparatus of claim 14, wherein the video encoder is further configured to determine the complexity measure by:
    performing a frequency domain transformation on the CTU producing a block of transform coefficients;
    calculating a second SATD value by summing all of the transform coefficients in the block of transform coefficients except for transform coefficients in a top-most row and a left-most column of the block transform coefficients; and
    assigning the second SATD value as the complexity measure.

18. The apparatus of claim 14, wherein the video encoder is further configured to determine the complexity measure by:
    performing a frequency domain transformation on the CTU producing a block of transform coefficients;
    calculating a first SATD value by summing all of the transform coefficients and subtracting a value of a transform coefficient at a DC coefficient position in the block of transform coefficients;
    calculating a second SATD value by summing all of the transform coefficients in the block of transform coefficients except for transform coefficients in a top-most row and a left-most column of the block transform coefficients; and
    selecting either the first SATD value or the second SATD value as the complexity measure based on one or more predetermined criteria.

19. The apparatus of claim 18, wherein the video encoder is further configured to:
    select the first SATD value as the complexity measure in the case that the first SATD value is smaller than a predetermined threshold; and
    select the second SATD value as the complexity measure in the case that the first SATD value is larger than a predetermined threshold.

20. The apparatus of claim 18, wherein the video encoder is further configured to:
    select the first SATD value as the complexity measure in the case that the intra frame of video data has a resolution smaller than 720p; and
    select the second SATD value as the complexity measure in the case that the intra frame of video data has a resolution greater than or equal to 720p.

21. The apparatus of claim 13, wherein the video encoder is configured to determine the complexity measure and the rate control parameter for the entire intra frame of video data.

22. The apparatus of claim 13, wherein the video encoder is configured to determine the rate control parameter by:
    calculating the equation $$\lambda = \alpha \left( \frac{C}{R_{target}} \right)^{\beta},$$

wherein $\lambda$ is the rate control parameter, C is the complexity measure, $R_{target}$ is the target bit rate, and $\alpha$ and $\beta$ are secondary rate control parameters.

23. The apparatus of claim 22, wherein the video encoder is further configured to:
    update the secondary rate control parameters on a frame level.

24. The apparatus of claim 22, wherein the video encoder is further configured to:
    update the secondary rate control parameters on a coding tree unit (CTU) level.

25. An apparatus configured to perform rate control in a video encoding process, the apparatus comprising:
    means for determining a complexity measure of an intra frame of video data based on a sum of absolute transformed differences (SATD) calculation on each block in the intra frame of video data, wherein the intra frame of video data is to be encoded using intra prediction;
    means for determining a rate control parameter for the intra frame based on the complexity measure and a target bit rate;
    means for determining intra prediction modes for the intra frame based on the determined rate control parameter for the intra frame;
    means for determining a quantization parameter based on the determined rate control parameter for the intra frame; and
    means for encoding the intra frame of video data using the determined intra prediction modes and the determined quantization parameter.

26. A non-transitory computer-readable storage medium storing instructions that, when executed, cause one or more processors of a device configured to encode video data to:
    determine a complexity measure of an intra frame of video data based on a sum of absolute transformed differences (SATD) calculation on each block in the intra frame of video data, wherein the intra frame of video data is to be encoded using intra prediction;
    determine a rate control parameter for the intra frame based on the complexity measure and a target bit rate;
    determine intra prediction modes for the intra frame based on the determined rate control parameter for the intra frame;
    determine a quantization parameter based on the determined rate control parameter for the intra frame; and
    encode the intra frame of video data using the determined intra prediction modes and the determined quantization parameter.

* * * * *